(12) United States Patent
Byun (10) Patent No.: US 9,706,352 B2
(45) Date of Patent: Jul. 11, 2017

(54) SYSTEM AND METHOD FOR DETERMINING A BOUNDARY OF A GEOGRAPHIC AREA

(75) Inventor: Jungkhun Byun, Seoul (KR)

(73) Assignee: Google Inc., Mountain View, CA (US)

( * ) Notice: Subject to any disclaimer, the term of this patent is extended or adjusted under 35 U.S.C. 154(b) by 913 days.

(21) Appl. No.: 13/345,604

(22) Filed: Jan. 6, 2012

(65) Prior Publication Data

US 2015/0172861 A1 Jun. 18, 2015

(51) Int. Cl.
*G06F 7/00* (2006.01)
*G06F 17/30* (2006.01)
*H04W 4/02* (2009.01)

(52) U.S. Cl.
CPC .................... *H04W 4/021* (2013.01)

(58) Field of Classification Search
None
See application file for complete search history.

(56) References Cited

U.S. PATENT DOCUMENTS

| | | | |
|---|---|---|---|
| 6,934,630 B2 * | 8/2005 | Linstrom | G01S 5/0036 342/357.48 |
| 6,934,634 B1 * | 8/2005 | Ge | G06F 17/30241 702/2 |
| 7,822,751 B2 * | 10/2010 | O'Clair et al. | 707/748 |
| 7,853,270 B2 * | 12/2010 | Riise et al. | 455/456.1 |
| 2005/0085999 A1 * | 4/2005 | Onishi | 701/211 |
| 2005/0137994 A1 * | 6/2005 | Fortin | G06F 17/30241 706/45 |
| 2006/0149774 A1 * | 7/2006 | Egnor | 707/102 |
| 2006/0200305 A1 * | 9/2006 | Sheha | G01C 21/20 701/420 |
| 2008/0133462 A1 * | 6/2008 | Aylward | G06F 17/30265 |
| 2009/0063524 A1 * | 3/2009 | Adler | G06F 17/30241 |
| 2009/0265340 A1 * | 10/2009 | Barcklay | G01C 21/3682 |
| 2010/0279710 A1 * | 11/2010 | Dicke | H04W 4/02 455/456.3 |
| 2011/0063138 A1 * | 3/2011 | Berkobin et al. | 340/988 |
| 2011/0320319 A1 * | 12/2011 | Streich | G06Q 30/06 705/27.1 |

* cited by examiner

*Primary Examiner* — Tuan A Pham
(74) *Attorney, Agent, or Firm* — Dority & Manning, P.A.

(57) ABSTRACT

Systems, methods, and machine-readable media for determining a boundary of a geographical area is provided. The system may include a pattern detection module, a location module, and a boundary module. The pattern detection module may be configured to identify a plurality of point of interest (POI) names associated with the geographical area from one or more web documents. The location module may be configured to identify a plurality of location coordinates corresponding to the identified POI names and the boundary module may be configured determine the boundary of the geographical area based on the location coordinates derived from the POI names.

13 Claims, 11 Drawing Sheets

Candidate List of Area Names

| Area Name | Count |
|---|---|
| Midtown | 1523 |
| SoMa | 2351 |
| Chinatown | 16234 |
| SoHo | 3245 |
| Upper West Side | 2635 |

SYSTEM AND METHOD FOR DETERMINING A BOUNDARY OF A GEOGRAPHIC AREA

BACKGROUND

The present disclosure generally relates to location based services and, in particular, to identifying geographical areas.

Information about geographical areas may be useful in many contexts (e.g., routing services, identification of points of interest, or other location based services). New geographical areas may form over time, change overtime, and, in some cases, cease to exist. Countries may form or split apart and cities may be incorporated or become abandoned. More informal geographical areas (e.g., neighborhoods, boroughs, parishes, business or shopping districts, etc.) may sometimes form within a larger town, city, state or region. These areas may be formed around a point of interest (POI) such as a landmark, commercial development (e.g., a shopping area, stadium, or plaza), neighborhood, or community. The boundaries of these geographical areas may also change over time. To illustrate, some of these informal geographical areas may include the neighborhoods of New York City, N.Y. such as SoHo, Time Square, the Lower East Side, Chinatown, Greenwich Village, East Village, Chelsea, Midtown, and the Upper West Side.

Identifying new and existing geographical areas and determining their boundaries may be useful for a variety of applications such as, for example, searching for locations of businesses or homes, viewing maps of a location, getting directions from one location to another, gathering real estate information, etc.

SUMMARY

According to one aspect of the subject technology, a system for determining a boundary of a geographical area is provided. The system may include a pattern detection module, a location module, and a boundary module. The pattern detection module may be configured to identify a plurality of point of interest (POI) names associated with the geographical area from one or more web documents. The location module may be configured to identify a plurality of location coordinates corresponding to the identified POI names and the boundary module may be configured determine the boundary of the geographical area based on the location coordinates derived from the POI names.

According to another aspect of the subject technology, a method for determining a boundary of a geographical area is provided. The method may include identifying a plurality of point of interest (POI) names associated with the geographical area from one or more web documents, locating, in a POI database, a plurality of POI listings corresponding to the identified POI names, and determining location coordinates of each of the POI listings. Based on the location coordinated derived from the POI listings, the method may further include calculating, using a processor, the boundary of the geographical area.

According to yet another aspect of the subject technology, a machine-readable medium including instructions stored therein, which when executed by a machine, cause the machine to perform operations for identifying a geographical area name based on one or more web documents is provided. The operations may include identifying a plurality of point of interest (POI) names associated with the geographical area from one or more web documents, determining a plurality of location coordinates corresponding to the identified POI names, and calculating boundary information for the geographical area based on the location coordinates derived from the POI names.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, methods and systems for determining the boundary of a geographical area are also provided. Knowing the boundary of a geographical area may be useful in a number of different applications such as when determining whether a location (e.g., a user's location, the location of a business, etc.) is within the geographical area, when displaying geographical areas on a mapping interface, when analyzing real estate information, and for a number of other location based services. However, boundary information for some geographical areas (especially informal geographical areas) are hard to come by.

In one aspect of the subject technology, a system may calculate the boundary of a geographical area by crawling the world wide web and identifying associations between point of interest (POI) and geographical areas in web documents (e.g., websites, blog posts, business reviews, articles, etc.). For example, the system may look for patterns in the web documents that include a POI name and a geographical area name. For each geographical area, the system may generate a list of location coordinates corresponding to the POI names associated with the geographic area in the web documents by searching, in a POI database containing various information about POIs, for the location coordinates of a POI using the POI name. The list of location coordinates may then be used to calculate the boundary for the geographical area.

Figure 1:
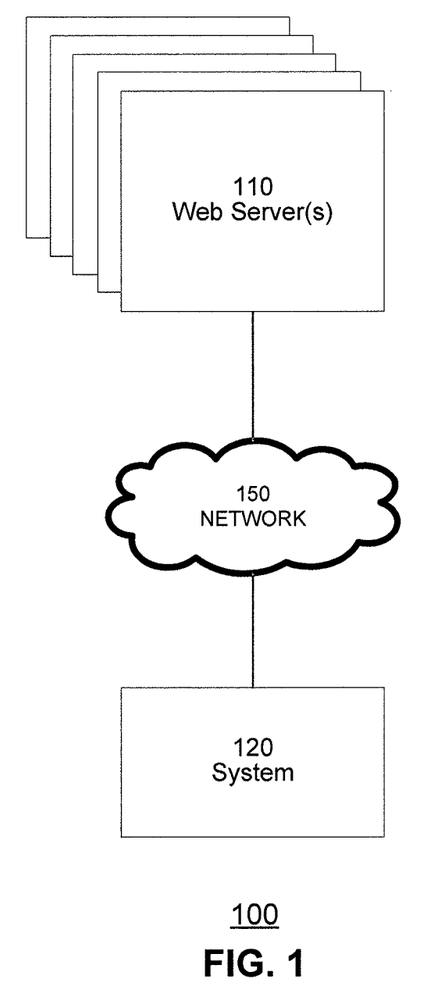
FIG. 1 is a conceptual diagram illustrating a network environment in which aspects of the subject technology may be implemented, in accordance with one aspect of the subject technology.

FIG. 1 is a conceptual diagram illustrating a network environment 100 in which aspects of the subject technology may be implemented, in accordance with one aspect of the subject technology. Although FIG. 1 illustrates a client-server network environment 100, other aspects of the subject technology may include other configurations including, for example, peer-to-peer environments or single system environments. The network environment 100 may include at least one web server 110 and at least one system 120 connected over a network 150. Each web server 110 may be any machine configured to store and deliver web documents to one or more systems 120 via the network 150.

The network 350 may include, for example, any one or more of a personal area network (PAN), a local area network (LAN), a campus area network (CAN), a metropolitan area network (MAN), a wide area network (WAN), a broadband network (BBN), the Internet, and the like. Further, the network 350 can include, but is not limited to, any one or more of the following network topologies, including a bus network, a star network, a ring network, a mesh network, a star-bus network, tree or hierarchical network, and the like.

The system 120 may be any system or device having a processor, a memory, and communications capability for communicating with one or more web servers 110 and retrieving web documents from the web servers 110. As will be discussed in further detail below, the system may further include one or more modules that may be configured to calculate a boundary for a geographical areas based on the patterns in the web documents. In one aspect of the subject technology, the system 120 may be a single computing machine (e.g., a personal computer, a server, a mobile device, a laptop, a tablet computer, etc.). However, in other aspects, the system 120 may be a virtual entity that might refer to a cluster or even multiple clusters of servers.

Identifying a New Geographical Area Name

According to various aspects of the subject technology, methods and systems for identifying a new geographical area name are provided. A system may identify new or developing geographical areas based on patterns found in web documents (e.g., websites, blog posts, business reviews, articles, etc.). The system may include a web crawling component configured to browse the world wide web and identify web documents containing a pattern that includes a known point of interest (POI) name and a geographical area name. One illustrative example of a pattern may be: "POI_NAME in GEO_NAME," where POI_NAME is a variable for a known point of interest name (e.g., the name of a business) and GEO_NAME is a variable for a geographical area name.

If a pattern is found, the system may look up the area name in the pattern in a database to determine if the area name is known. If the area name is not known to the system (e.g., the area name in the pattern was not found in the database), the system may classify the area name as a candidate for the new area name. The system may then identify one or more new geographical area names based on the candidates for the new area name.

Figure 2:
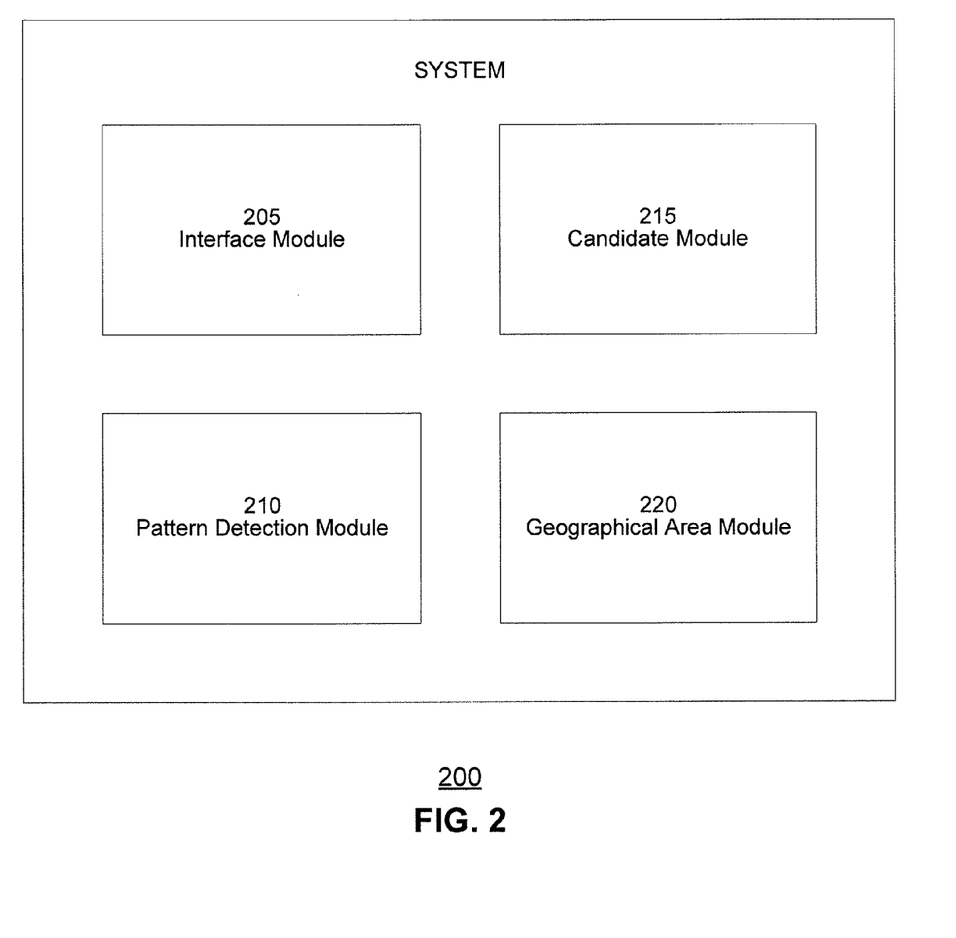
FIG. 2 is a conceptual diagram illustrating a system for identifying a geographical area name based on one or more web documents, in accordance with one aspect of the subject technology.

FIG. 2 is a conceptual diagram illustrating a system 200 for identifying a geographical area name based on one or more web documents, in accordance with one aspect of the subject technology. The system 200 may be implemented in an environment such as network environment 100 of FIG. 1 and may include an interface module 205, a pattern detection module 210, a candidate module 215, and a geographical area module 220. The modules illustrated in FIG. 2 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The interface module 205 may be configured to communicate with one or more client machines or servers. For example, the interface module 205 may request and retrieve web documents from a number of web servers 110. In one aspect, the interface module 205 may browse the world wide web in a systematic manner (e.g., web crawling). The web documents may include, for example, web sites, blog posts, business reviews, articles, files on the world wide web, or any other document stored on a web server.

For each web document received, the pattern detection module 210, may analyze the web document in order to identify one or more patterns in the web document. For example, the pattern detection module 210 may look for predetermined patterns that include a point of interest (POI) name and an area name. The POI name may be the name of any location that one may find useful or interesting such as a business, a government office, a landmark, or any other identifiable location.

If a pattern containing a POI name and an area name is detected in a web document, the candidate module 215 may be configured to check a candidate list of area name to see if the detected area name is already in the candidate list. If the detected area name is not on the candidate list, the candidate module 215 may add the detected area name to the candidate list. If the detected area name is already on the candidate list, the candidate module 215 may increment a count associated with the detected area name on the candidate list thereby indicating that another instance of the area name has been detected.

After a number of web documents have been analyzed, the geographical area module 220 may be configured to select a new geographical area name from the candidate list of area names based on the counts associated with the area names on the candidate list. For example, the geographical area module 220 may identify all area names on the candidate list that are associated with counts that exceed a certain threshold as the new geographical area name. In another aspect, the geographical area module 220 may identify only a number of area names on the candidate list that are associated with the highest counts (e.g., the area name with the highest count or the 5 area names with the highest counts). Further details of aspects of the subject technology are discussed with respect to FIG. 3.

Figure 3:
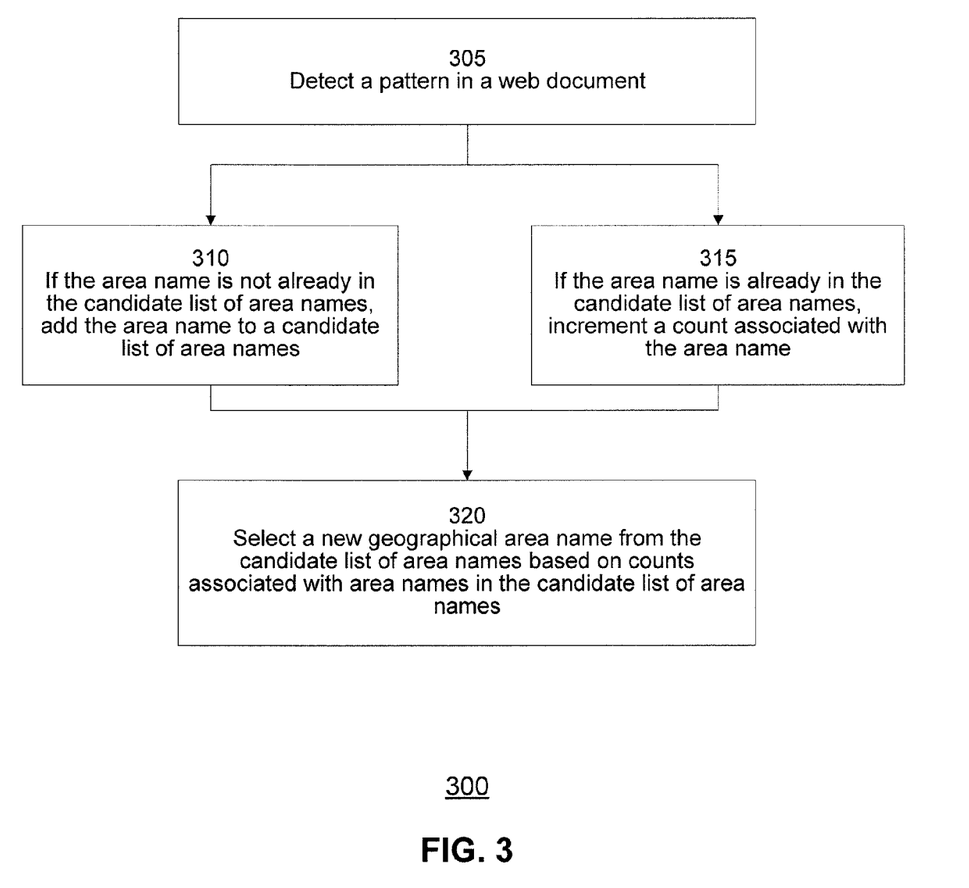
FIG. 3 is a flow chart illustrating a process for identifying a new geographical area name based on one or more web documents, in accordance with one aspect of the subject technology.

FIG. 3 is a flow chart illustrating a process 300 for identifying a new geographical area name based on one or more web documents, in accordance with one aspect of the subject technology. The process 300 may begin by obtaining one or more web documents on the world wide web. At operation 305, the pattern detection module 210 may detect a pattern in the one or more web documents. The pattern detected in the web documents may be a predetermined pattern that includes a known POI name and a place for an area name.

Figure 4:
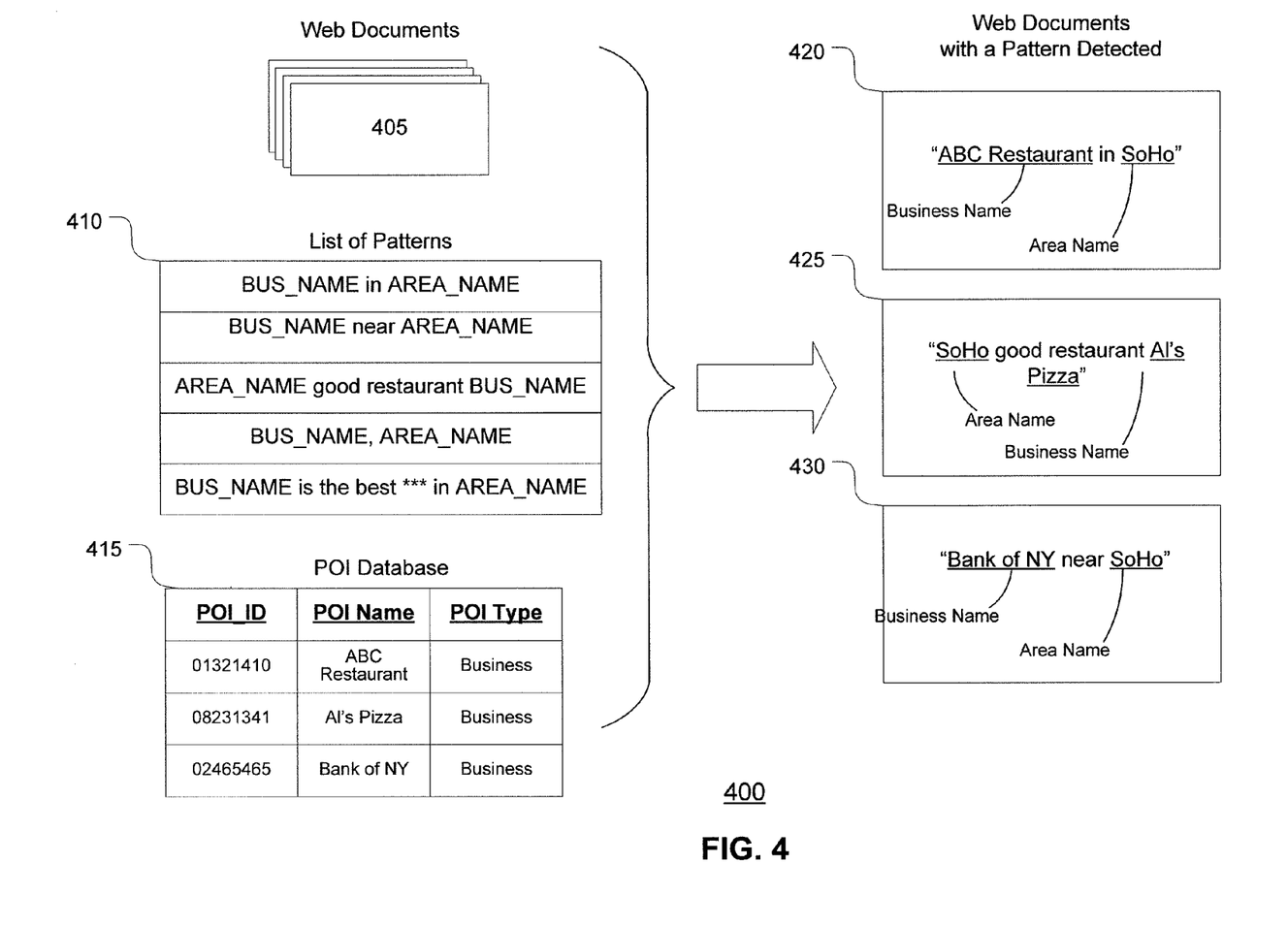
FIG. 4 is a conceptual diagram illustrating the detection of a pattern in web documents, in accordance with one aspect of the subject technology.

For example, FIG. 4 is a conceptual diagram 400 illustrating the detection of a pattern in web documents 405, in accordance with one aspect of the subject technology. The conceptual diagram 400 may include the one or more web documents 405 obtained by the interface module 205, a list of predefined patterns 410 managed by the pattern detection module 210, and a point of interest (POI) database 415 containing information on known points of interest. As discussed above, the patterns in the list of predefined patterns 410 may include a POI name (in the examples shown in FIG. 4, the POI names are the names of a business) and an area name. The POI database 415 may include, for example, a unique identifier for each POI in the database, a name for each POI, a POI type associated with the POI, and any other information associated with a point of interest.

Based on the list of predefined patterns 410 and the POI database 415, the pattern detection module 210 may detect patterns in the web documents. Referring to FIG. 4, for example, the pattern detection module 210 may analyze web document 420 and identify a pattern in the web document 420 that matches one of the patterns in the list of predetermined patterns 410. For example, the text "ABC Restaurant in SoHo" in the web document 420 matches the pattern "BUS_NAME in AREA NAME" where BUS_NAME is the name of a business type POI in the POI database 415. "SoHo" appears in the text of the web document 420 where, according to the pattern, an area name should occur. As a result, "SoHo" may be identified as a potential area name.

Similarly, the pattern detection module 210 may analyze web document 425 and determine that the text "SoHo good restaurant Al's Pizza" in the web document 425 matches the pattern "AREA NAME good restaurant BUS_NAME" where BUS_NAME is the name of a business type POI in the POI database 415. Again, "SoHo" appears in the text of the web document 425 where, according to the pattern, an area name should occur. As a result, "Solo" may be a possible new area name.

As for web document 430, the text "Bank of NY near SoHo" in the web document 420 may correspond with the pattern "BUS_NAME near AREA NAME" where BUS_NAME is the name of a business type POI in the POI database 415. "SoHo" appears in the text of the web document 420 where the area name should occur. As a result, "SoHo" may be identified as a potential area name.

Referring back to FIG. 3, after a pattern is detected in the web page, the candidate module 215 may add the area name identified in the pattern to a candidate list of area names at operation 310. The candidate list of area names may be a list of area names that have been identified in patterns in one or more documents and represent potential new area names. Each area name in the candidate list may be associated with a count based on the number of times the area name has been identified in a pattern in the one or more documents. If the area name is already in the candidate list of area names, however, the candidate module 215 may increment the count associated with the area name at operation 315. Additional aspects of the subject technology may be better understood with respect to FIG. 5.

Figure 5:
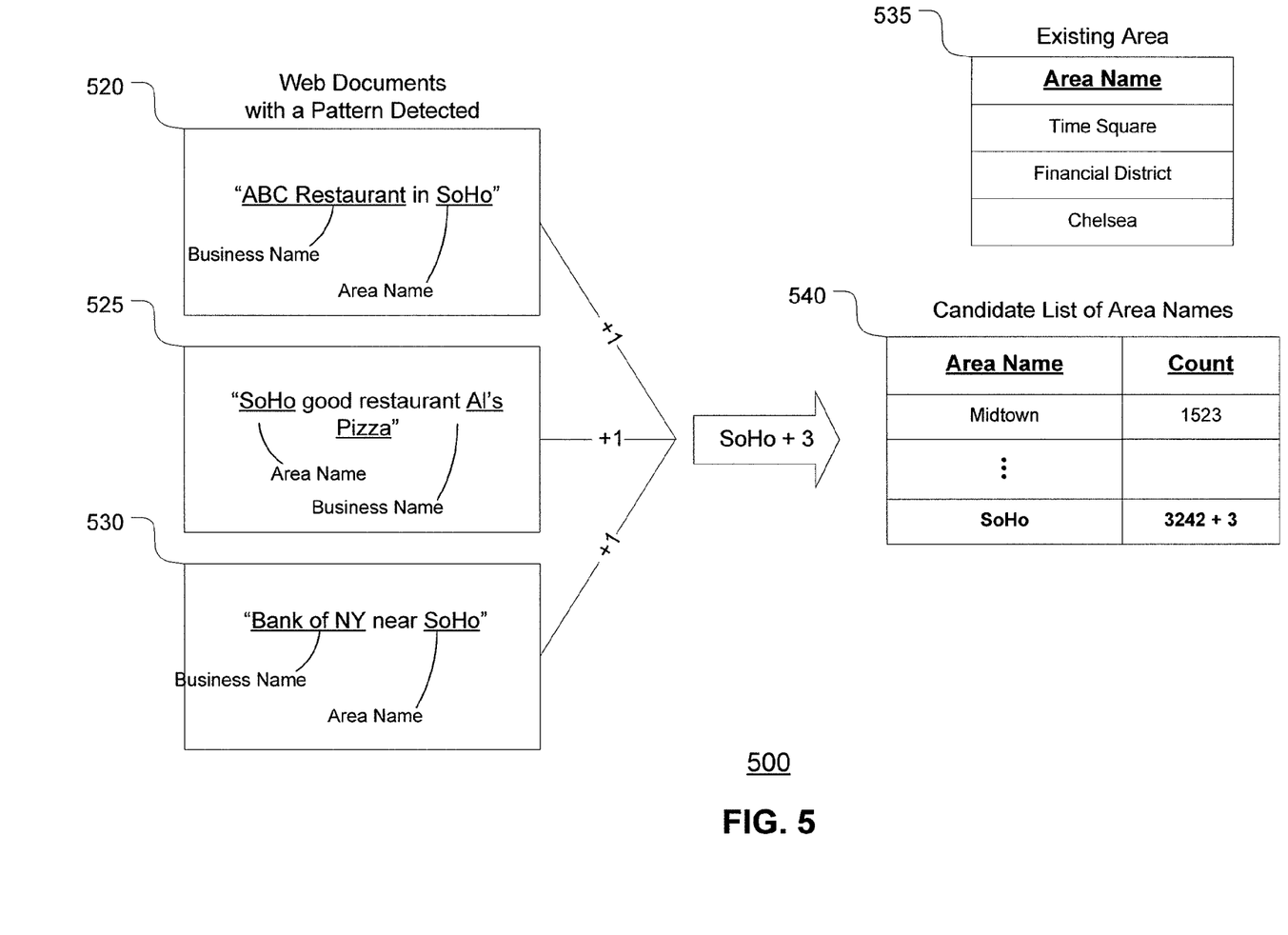
FIG. 5 is a conceptual diagram illustrating the inclusion of a potential new area name in a candidate list of area names, in accordance with one aspect of the subject technology.

FIG. 5 is a conceptual diagram 500 illustrating the inclusion of a potential new area name in a candidate list of area names 540, in accordance with one aspect of the subject technology. The web documents 520, 525, and 530 may be web documents in which one or more patterns were detected by the pattern detection module 210. In this example illustration, the patterns identified in the web documents 520, 525, and 530 all indicate that "SoHo" is a possible area name.

In some aspects of the subject technology, in order to prevent adding already known areas to the candidate list for new area names, the candidate module 215 may compare the possible area name (e.g., SoHo) with the area names in a list of known and existing area names 535 or a database of geographical area information. If the possible area name identified in the web documents (e.g., SoHo) is already known, then there may be no need to include the possible area name in the candidate list. If, on the other hand, the possible area name identified in the web documents (e.g., SoHo) is not known or not in the list of existing area names, the candidate module 215 may include the possible area name in the candidate list of area names 540.

As is illustrated in FIG. 5, the possible area name identified in the web documents (e.g., SoHo) may already be included in the candidate list of area names 540. Accordingly, instead of adding the possible area name to the candidate list of area names 540, the candidate module 215 may increment the count associated with the possible area name.

Figure 6:
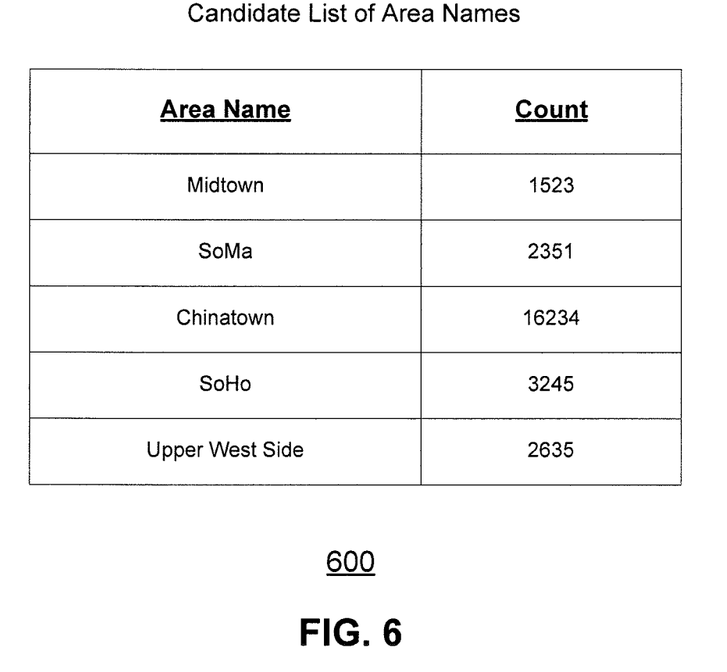
FIG. 6 is a conceptual diagram illustrating a candidate list of area names, in accordance with one aspect of the subject technology.

Referring back to FIG. 3, at operation 320, the geographic area module 220 may select a new geographic area from the candidate list of area names based on the counts associated with the area names in the candidate list. FIG. 6 is a conceptual diagram illustrating a candidate list of area names 600, in accordance with one aspect of the subject technology. The candidate list of area names 600 may be generated based on the patterns detected in one or more web documents as discussed above.

The geographic area module 220 may select one or more area names in the candidate list 600 based on the count associated with an area list exceeding a threshold. For example, if the threshold for the count was 3000, area names "Chinatown" and "SoHo" may be selected as the names for new geographic areas. In another aspect, the geographic area module 220 may select one or more area names associated with the highest counts. For example, the geographic area module 220 may select the 3 area names associated with the highest counts (e.g., "Chinatown," "SoHo," and "Upper West Side") as the names of the new geographic areas.

The selected geographical area names may then be stored in a database containing information about geographical areas. Once an entry is created for the geographical area in the database, other information about the geographical area may also be stored along with the geographical area name. In one aspect, the new geographical area name may also be used to determine further information about a geographical area such as the boundary of the geographical area.

Determining the Boundary of the Geographic Area

According to various aspects of the subject technology, methods and systems for determining the boundary of a geographical area are also provided. The system may calculate the boundary of a geographical area by identifying associations between point of interest (POI) names and the geographical area in one or more web documents (e.g., websites, blog posts, business reviews, articles, etc.). The system may generate a list of location coordinates corresponding to the POI names associated with the geographic area in the web documents by searching, in a POI database, for the location coordinates of a POI using the POI name. The list of location coordinates may then be used to calculate the boundary of the geographical area.

Figure 7:
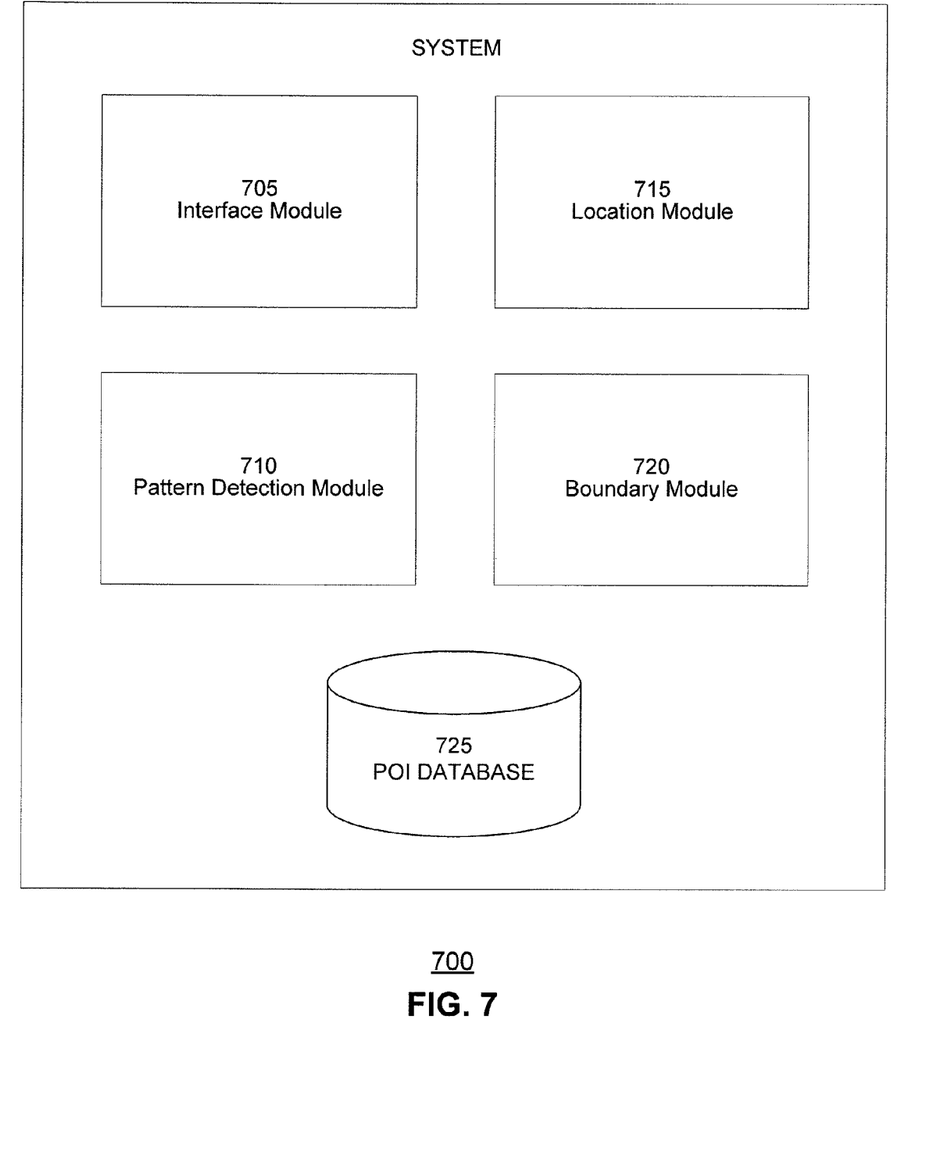
FIG. 7 is a conceptual diagram illustrating a system for identifying a geographical area name based on one or more web documents, in accordance with one aspect of the subject technology.

FIG. 7 is a conceptual diagram illustrating a system 700 for identifying a geographical area name based on one or more web documents, in accordance with one aspect of the subject technology. The system 700 may be implemented in an environment such as network environment 100 of FIG. 1 and may include an interface module 705, a pattern detection module 710, a location module 715, a boundary module 720, and a point of interest (POI) database 725. The modules illustrated in FIG. 7 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The POI database 725 may be a database containing a number of POI listings. Each listing may include information about a point of interest such as a POI name, a POI type (e.g., business, residential, landmark, park, etc.), one or more POI categories (e.g., restaurant, pizza restaurant, retail store, post office, etc.), location information (e.g., location coordinates such as GPS coordinates), or any other information about a point of interest.

The interface module 705 may be configured to communicate with one or more client machines or servers. For example, the interface module 705 may request and retrieve web documents from a number of web servers 110. In one aspect, the interface module 705 may browse the world wide web in a systematic manner (e.g., web crawling). The web documents may include, for example, web sites, blog posts, business reviews, articles, files on the world wide web, or any other data that may be distributed by a web server.

For each web document received, the pattern detection module 210, may analyze the web document in order to identify one or more patterns in the web document. For example, the pattern detection module 210 may look for predetermined patterns that include a point of interest (POI) name and a geographical area name. The POI names and the geographical area names may be detected by the pattern detection module 210 using one or more databases containing information about points of interest (e.g., a POI database) and geographical information (e.g., a Geo database).

The POI name may be, for example, the name of a business, an office, a landmark, or any other location with an entry or listing in a POI database.

In one aspect, the web documents and patterns used to identify a new geographical area name may also be used in order to determine the boundary of the area associated with the geographical area name. In other aspects, however, the system may search for other patterns in other documents that may be associated with any geographical area.

If a pattern containing a POI name and a reference to a geographical area (e.g., a geographical area name) is detected in a web document, the location module 715 may be configured to identify a POI listing in the POI database that corresponds to the POI name and determine, using the POI listing, location coordinates for the POI name. The location module 715 may then store an association of the location coordinates for the POI name and the geographic area detected in the pattern.

The boundary module 720 may be configured to calculate the boundary of a geographic area based on the location coordinates associated with the geographic area. For example, the boundary module 720 may generate a convex hull of all or a subset of the location coordinates associated with the geographic area. In some aspects, quality control measures may be taken in order to validate that the location coordinates associated with the geographic area. For example, the boundary module 720 may be configured to eliminate certain location coordinates that have been associated with the geographic area which may be outliers or which may not accurately reflect the actual boundaries of the geographical area. Further details of aspects of the subject technology are discussed with respect to FIG. 8.

Figure 8:
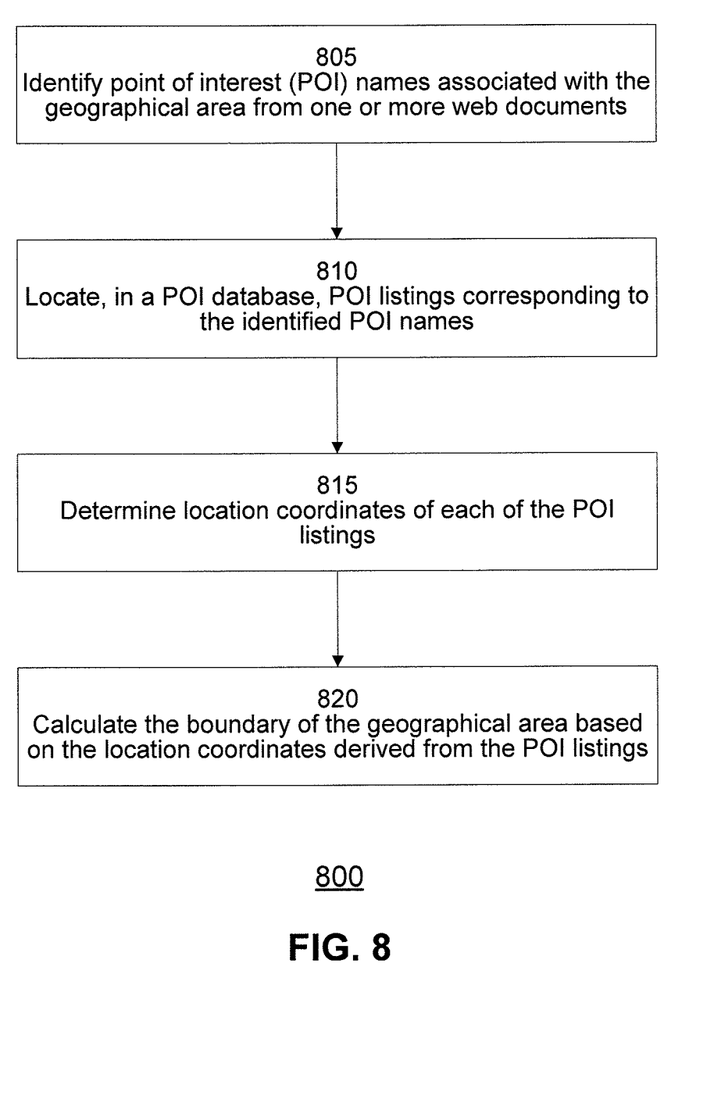
FIG. 8 is a flow chart illustrating a process for determining a boundary of a geographical area, in accordance with one aspect of the subject technology.

FIG. 8 is a flow chart illustrating a process 800 for determining a boundary of a geographical area, in accordance with one aspect of the subject technology. The process 800 may begin by receiving one or more web documents on the world wide web. At operation 805, the pattern detection module 710 may identify point of interest (POI) names associated with a geographical area from one or more web documents.

Figure 9:
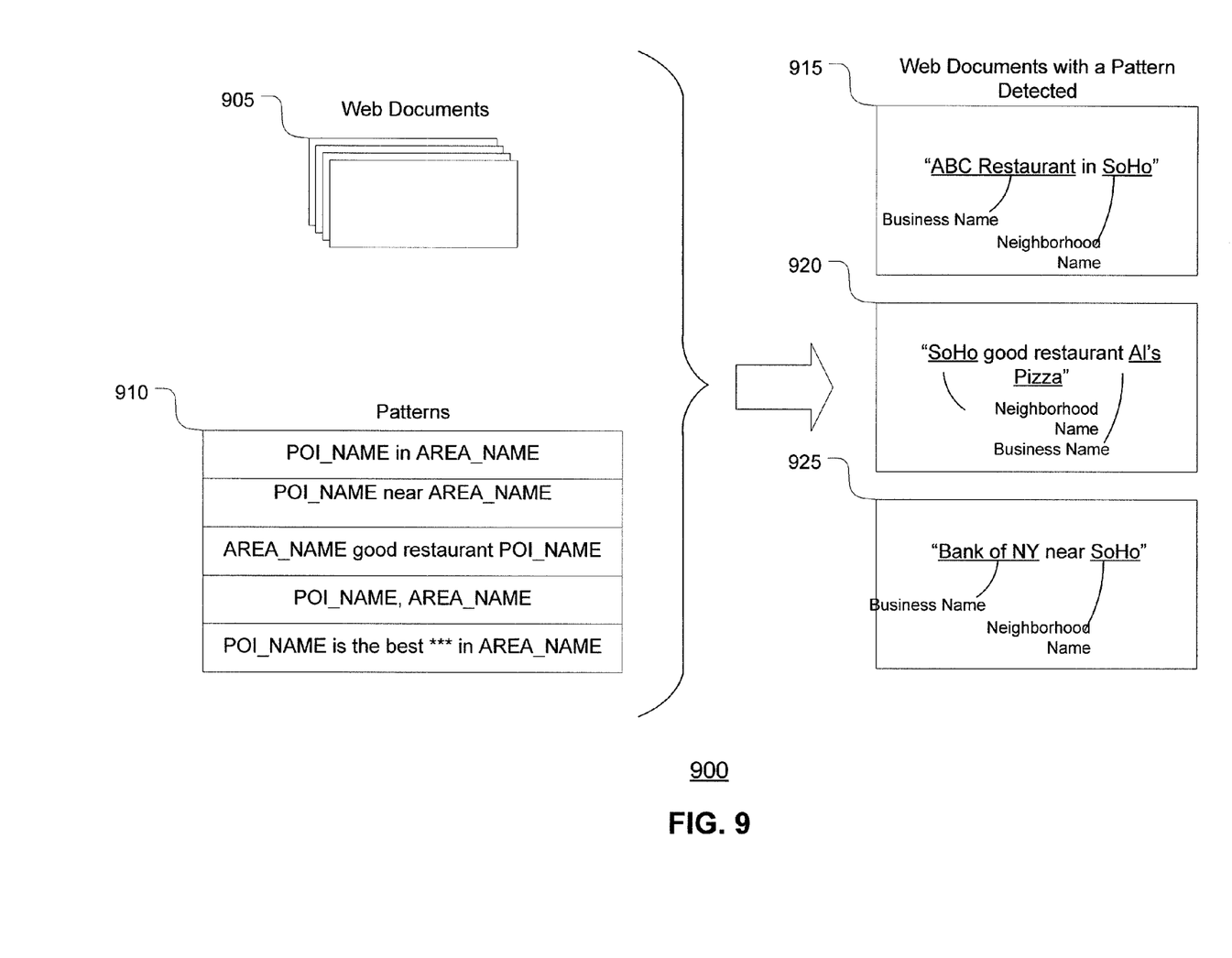
FIG. 9 is a conceptual diagram illustrating the detection of a pattern in web documents, in accordance with one aspect of the subject technology.

For example, FIG. 9 is a conceptual diagram 900 illustrating the detection of a pattern in web documents 905, in accordance with one aspect of the subject technology. The pattern detection module 710 may analyze the web documents 905 obtained by the interface module 705 in order to find one or more patterns 910 in the one or more web documents that include a known POI name (e.g., a business name) and a known geographical area name. The pattern detection module 710 may be use a POI database containing the names of points of interest and a database of geographical information containing geographical area names to help recognize the patterns 910 in the web documents and identify the points of interest associated with a geographical area. For example, based on the web documents 915, 920, and 925, points of interest "ABC Restaurant," "Al's Pizza," and "Bank of NY" are associated with the geographical area "SoHo."

Referring back to FIG. 8, the location module 715 may locate POI listings in a POI database that correspond with the point of interest names associated with the geographical area at operation 810. As described above, the POI database may contain a POI listing corresponding to each of the point of interest names identified in patterns in the web documents. Each listing may include a POI name, a unique POI ID, location data (e.g., location coordinates) for the POI, and any other data associated with the POI. At operation 815, the location module 715 may determine the location coordinates for each of the POI listings located at operation 810 and associate them with the geographical area (e.g., "SoHo").

Figure 10:
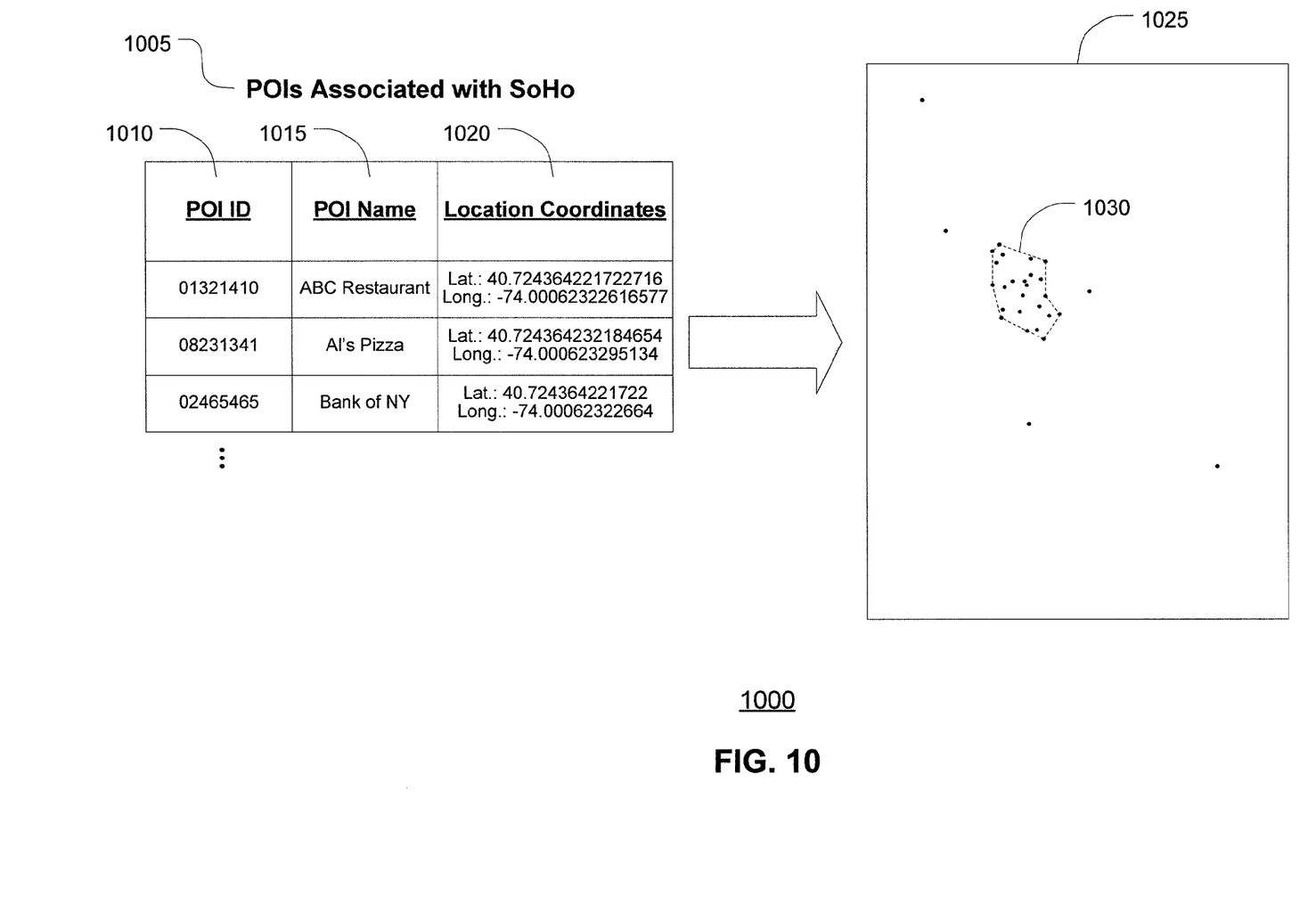
FIG. 10 is a conceptual diagram 1000 illustrating the calculation of a boundary of a geographical area, in accordance with one aspect of the subject technology.

At operation 820, the boundary module 720 may calculate the boundary of the geographical area based on the location coordinates derived from the POI listings. For example, FIG. 10 is a conceptual diagram 1000 illustrating the calculation of a boundary of a geographical area, in accordance with one aspect of the subject technology. Conceptual diagram 1000 includes a list of points of interest (POIs) 1005 associated with the geographical area "SoHo" as identified based on the patterns in the web documents. Each POI may be associated with a POI name 1015, a unique identifier 1010, and location coordinates 1020 taken from the POI listing associated with the POI.

Based on these location coordinates 1020, the boundary module 720 may calculate boundary information for the geographical area "SoHo." Conceptually, each of the location coordinates 1020 associated with the geographical area "SoHo" may be represented as a point on a map 1025 and the boundary of the geographical area "SoHo" 1030 that is generated may be represented as one or more polygons on the map 1025.

After the boundary for the geographical area is generated, the boundary module 720 may store the boundary information in a geographical database containing information about geographical areas (e.g., a geographical area identifier, a geographical area name, a geographical area location, a geographical area boundary, etc.). In some aspects, the geographical area database may already contain boundary information for a geographical area. Accordingly, the boundary module 720 may use the calculated boundary to update the boundary information for the geographical area.

As is conceptually illustrated in map 1025 of FIG. 10, not all location coordinates 1020 may be used to calculate the boundary of the geographical area 1030. In one aspect of the subject technology, the boundary module 720 may statistically analyze the location coordinates 1020 to identify outliers that are unlikely to be within the boundary of the geographical area. These outliers may be omitted and the remaining location coordinates may be used to calculate the boundary for the geographical area 1030.

In one aspect, the boundary module 720 may generate a series of radiuses from a central point within the geographical area (e.g., a central location obtained from the geographical database). The areas between each pair of successive radiuses may each be assigned a threshold number of location coordinates. The threshold numbers may gradually decrease as the areas move further and further from the central point within the geographical area. For example, the threshold number of location coordinates between a first radius at 500 meters and a second radius at 1 kilometers may be more than the threshold number of location coordinates between the second radius and a third radius at 1.5 kilometers.

If the number of location coordinates between a pair of successive radiuses (e.g., the second radius and the third radius) falls below the threshold number of location coordinates for that area, the boundary module 720 may eliminate all location beyond one of the pair of radiuses (e.g., all location coordinates beyond the second radius or all location coordinates beyond the third radius). The remaining locations in the set will be used to calculate the boundary of the geographical area.

Figure 11:
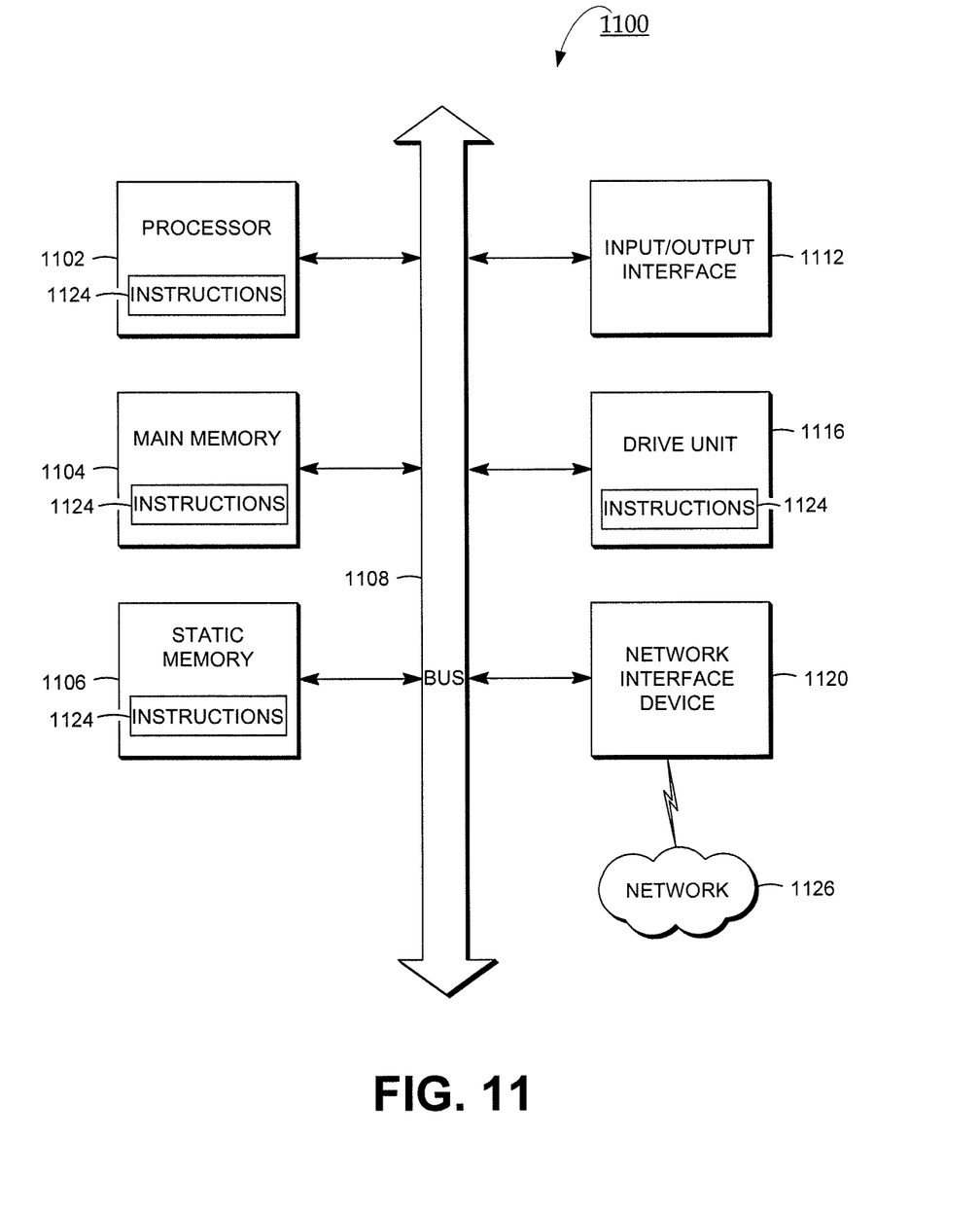
FIG. 11 is a block diagram illustrating a computer system with which any of the clients, servers, or systems of FIG. 1, FIG. 2, or FIG. 7 may be implemented, according to various aspects of the subject technology.

FIG. 11 is a block diagram illustrating a computer system with which any of the clients, servers, or systems of FIG. 1, FIG. 2, or FIG. 7 may be implemented, according to various aspects of the subject technology. In certain aspects, the computer system 1100 may be implemented using hardware or a combination of software and hardware, either in a dedicated server, or integrated into another entity, or distributed across multiple entities.

The example computer system 1100 includes a processor 1102, a main memory 1104, a static memory 1106, a disk drive unit 1116, and a network interface device 1120 which communicate with each other via a bus 1108. The computer system 1100 may further include an input/output interface 1112 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 1102 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 1124 embodying any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media. The instructions 1124 may further be transmitted or received over a network 1126 via the network interface device 1120.

The machine-readable medium may be a single medium or multiple media (e.g., a centralized or distributed database, and/or associated caches and servers) that store the one or more sets of instructions. The machine-readable medium may include the drive unit 1116, the static memory 1106, the main memory 1104, the processor 1102, an external memory connected to the input/output interface 1112, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for determining a boundary of a geographical area is provided. The system may include a pattern detection module, a location module, and a boundary module. The pattern detection module may be configured to identify a plurality of point of interest (POI) names associated with the geographical area from one or more web documents. The location module may be configured to identify a plurality of location coordinates corresponding to the identified POI names and the boundary module may be configured determine the boundary of the geographical area based on the location coordinates derived from the POI names.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for determining a boundary of a geographical area, the method comprising:
    identifying, by one or more computing devices, a plurality of point of interest (POI) names associated with the geographical area from one or more web documents, wherein identifying the plurality of POI names comprises retrieving the one or more web documents using a web crawling component and detecting, in the one or more web documents, a plurality of patterns from a list of predetermined patterns, each pattern including a POI name and a geographical area name arranged in a predetermined manner;
    locating, by the one or more computing devices, in a POI database, a plurality of POI listings corresponding to the identified POI names;
    determining, by the one or more computing devices, location coordinates derived from each of the POI listings;
    when a number of instances of detection of the geographic area reaches a threshold, calculating, by the one or more computing devices, the boundary of the geographical area, wherein the calculating step includes:
        identifying at one or more outlier location coordinates from the location coordinates derived from the POI listings;
        generating an updated list of location coordinates associated with the geographical area based on removing the outlier location coordinates from the location coordinates derived from the POI listings; and
        calculating the boundary of the geographical area based on the updated list of location coordinates associated with the geographical area; and
    storing, by the one or more computing devices, data indicative of the boundary of the geographical area in a database containing information associated with the geographical area.

2. The method of claim 1, wherein the calculating of the boundary of the geographical area comprises generating a convex hull using the updated list of location coordinates derived from the POI listings.

3. The method of claim 1, further comprising updating a boundary associated with the geographic area stored in a database with the calculated boundary for the geographic area.

4. The method of claim 1, wherein the POI database contains a plurality of POI listings wherein each POI listing includes a POI name and a location coordinate.

5. The method of claim 1, wherein the plurality of POI listings includes at least one business listing.

6. A system for determining a boundary of a geographical area, the system comprising:

one or more processors; and a machine-readable medium comprising instructions stored therein, which when executed by the one or more processors, cause the one or more processors to perform operations comprising:

identifying a plurality of point of interest (POI) names associated with the geographical area from one or more web documents, wherein identifying the plurality of POI names comprises retrieving the one or more web documents using a web crawling component and detecting, in the one or more web documents, a plurality of patterns from a list of predetermined patterns, each pattern including a POI name and a geographical area name arranged in a predetermined manner;

identifying a plurality of location coordinates corresponding to the identified POI names;

when a number of instances of detection of the geographic area reaches a threshold, determining the boundary of the geographical area, wherein the determining step includes:

identifying at one or more outlier location coordinates from the location coordinates corresponding to the identified POI names;

generating an updated list of location coordinates associated with the geographical area based on removing the outlier location coordinates from the location coordinates corresponding to the identified POI names; and calculating the boundary of the geographical area based on the updated list of location coordinates associated with the geographical area; and storing data indicative of the boundary of the geographical area in a database containing information associated with the geographical area.

7. The system of claim 6, wherein the determining of the boundary of the geographical area comprises generating a convex hull using the updated list of location coordinates derived from the POI names.

8. The system of claim 6, wherein the operations further comprise updating a boundary associated with the geographic area stored in a database with the determined boundary for the geographic area.

9. The system of claim 6, wherein the identifying of the plurality of location coordinates corresponding to the identified POI names comprises identifying a plurality of POI listings in a POI database using the identified POI names and determining location coordinates associated with each of the POI listings.

10. A non-transitory machine-readable medium comprising instructions stored therein, which when executed by a machine, cause the machine to perform operations comprising:

identifying a plurality of point of interest (POI) names associated with the geographical area from one or more web documents, wherein identifying the plurality of POI names comprises retrieving the one or more web documents using a web crawling component and detecting, in the one or more web documents, a plurality of patterns from a list of predetermined patterns, each pattern including a POI name and a geographical area name arranged in a predetermined manner;

determining a plurality of location coordinates corresponding to the identified POI names; and calculating boundary information for the geographical area, wherein the calculating step includes:

identifying at one or more outlier location coordinates from the location coordinates corresponding to the identified POI names;

generating an updated list of location coordinates associated with the geographical area based on removing the outlier location coordinates from the location coordinates corresponding to the identified POI names; and calculating the boundary of the geographical area based on the updated list of location coordinates associated with the geographical area; and storing data indicative of the boundary of the geographical area in a database containing information associated with the geographical area.

11. The non-transitory machine-readable medium of claim 10, wherein the identifying step comprises detecting a pattern in each of the one or more web documents, the pattern comprising a POI name and a name of the geographical area.

12. The non-transitory machine-readable medium of claim 10, wherein the operations further include updating boundary information associated with the geographic area stored in a database with the calculated boundary for the geographic area.

13. The non-transitory machine-readable medium of claim 10, wherein the determining step comprises identifying a plurality of POI listings in a POI database using the identified POI names and determining location coordinates associated with each of the POI listings.

* * * * *